(12) United States Patent
Campbell et al.

(10) Patent No.: US 8,178,277 B2
(45) Date of Patent: May 15, 2012

(54) ELECTROMAGNETIC RADIATION OR THERMALLY SENSITIVE COMPOSITION

(75) Inventors: Jonathan Campbell, Riehen (CH); Adolf Käser, Bottmingen (CH)

(73) Assignee: Datalase Ltd., Widnes, Cheshire (GB)

( * ) Notice: Subject to any disclaimer, the term of this patent is extended or adjusted under 35 U.S.C. 154(b) by 258 days.

(21) Appl. No.: 12/519,423

(22) PCT Filed: Dec. 21, 2007

(86) PCT No.: PCT/EP2007/064408
§ 371 (c)(1),
(2), (4) Date: Jun. 16, 2009

(87) PCT Pub. No.: WO2008/083912
PCT Pub. Date: Jul. 17, 2008

(65) Prior Publication Data
US 2010/0104825 A1    Apr. 29, 2010

(30) Foreign Application Priority Data
Jan. 9, 2007   (EP) ..................... 07100263

(51) Int. Cl.
G03F 7/00 (2006.01)
G03F 7/004 (2006.01)
G03F 7/105 (2006.01)
G03F 7/029 (2006.01)

(52) U.S. Cl. ......... 430/270.1; 430/7; 430/905; 430/913; 430/918; 430/944; 430/945; 430/964

(58) Field of Classification Search ........... 430/7, 270.1, 430/905, 944, 945, 964, 913, 918
See application file for complete search history.

(56) References Cited

U.S. PATENT DOCUMENTS

| 3,161,770 A | 12/1964 | Huett et al. |
| 5,413,629 A * | 5/1995 | Yasui et al. ............. 106/31.15 |
| 6,210,472 B1 | 4/2001 | Kwan et al. |
| 2009/0191420 A1* | 7/2009 | O'Donoghue et al. ....... 428/523 |
| 2009/0220749 A1* | 9/2009 | O' Donoghue et al. ... 428/195.1 |

FOREIGN PATENT DOCUMENTS

| DE | 4407905 A1 | 9/1995 |
| JP | 61-022988 A | 1/1986 |
| JP | 63-172689 | 7/1988 |
| JP | 9-156228 | 6/1997 |
| WO | 2007/031454 A2 | 3/2007 |

OTHER PUBLICATIONS

Machine translation of JP 09-156228.*
E. Anklam, Food Chemistry vol. 63, No. 4, Dec. 1998, pp. 549-562.
English Language Abstract No. 1986:433071 of JP 61-022988.
Patent Abstracts of Japan PN 09156228.
Patent Abstracts of Japan PN 63172689.
English language abstract of DE 4 407 905 printed from the esp@cenet web site May 27, 2009.

* cited by examiner

*Primary Examiner* — Amanda C. Walke
(74) *Attorney, Agent, or Firm* — Stoel Rives LLP

(57) ABSTRACT

The present invention provides coating compositions comprising (i) a) a compound containing a free carbonyl group and b) a nucleophile or (ii) a compound containing a free carbonyl group, which compound is substituted with one or more nucleophilic groups. The present invention also provides a process for the preparation of these compositions, substrates coated with these compositions and a process for their preparation, a process for preparing marked substrates using these compositions, and marked substrates obtainable by the latter process.

9 Claims, No Drawings

ELECTROMAGNETIC RADIATION OR THERMALLY SENSITIVE COMPOSITION

The present invention refers to a coating composition for marking substrates, to a process for the preparation of these compositions, to substrates coated with these compositions and to a process for their preparation, to a process for preparing marked substrates using these compositions, and to marked substrates obtainable by the latter process.

Packaging usually needs to be marked with information such as logos, bar codes, expiry dates or batch numbers. One way to achieve this is by coating the packaging with a composition, which upon treatment with energy such as heat forms a visible marking.

WO 02/068205 describes a method for marking an object, wherein the object comprises or is coated with a formulation comprising a material having functional groups such as polyhydroxy compounds, and a metal compound such as alkali metal, alkaline earth metal, iron oxides or salts and organometallics. The two components react on irradiation with a laser to form a product of contrasting colour.

The compositions of WO 02/068205 have the disadvantage that high energies (usually at least 5 watt laser power) are required to form the marking and often low contrast markings are obtained. In addition, the described compositions are not suitable for coating paper or polymer films.

It is an object of the present invention to provide coating compositions, which yield markings of high contrast on exposure to low energies. In addition, the coating compositions should also be suitable for coating paper or polymer films.

These objects are solved by the coating compositions, the processes, and the substrates described herein.

The composition of the present invention comprises (i) a) a compound containing a free carbonyl group and b) a nucleophile or (ii) a compound containing a free carbonyl group, which compound is substituted with one or more nucleophilic groups.

The compound containing a free carbonyl group can be any compound containing a carbonyl group, which is capable of reacting with a nucleophile such as an amine. Examples of compounds containing a free carbonyl group are aldehydes, ketones and reducing carbohydrates.

Aldehydes can be of formula $R^1$—C(O)—H. $R^1$ can be hydrogen, $C_{1-12}$-alkyl, $C_{2-12}$-alkenyl, aryl or $C_{4-8}$-cycloalkyl, wherein $C_{1-12}$-alkyl, $C_{2-12}$-alkenyl, aryl and $C_{4-8}$-cycloalkyl can be unsubstituted or substituted with one or more $C_{1-12}$-alkyl, $C_{2-12}$-alkenyl, aryl, $C_{4-8}$-cycloalkyl, —O—$C_{1-12}$-alkyl, hydroxyl, halogen, amino, —NH—C(=NH)—$NH_2$, —SH, —S—$C_{1-12}$-alkyl, —COOH, —C(O)—$NH_2$, —OC(O)$R^2$ and/or —C(O)—$OR^3$, provided $C_{1-12}$-alkyl and $C_{2-12}$-alkenyl are not substituted with $C_{1-12}$-alkyl or $C_{2-12}$-alkenyl, aryl is not substituted with aryl and $C_{4-8}$-alkyl is not substituted with $C_{4-8}$-alkyl, and wherein a $C_{1-12}$-alkyl or aryl substituent can additionally be substituted with one or more —$C_{1-12}$-alkyl, —O—$C_{1-12}$-alkyl, hydroxyl, halogen, amino, —NH—C(=NH)—$NH_2$, —SH, —S—$C_{1-12}$-alkyl, —COOH, —C(O)—$NH_2$, —OC(O)$R^2$ and/or —C(O)—$OR^3$, provided an $C_{1-12}$-alkyl substitutent is not additionally substituted with a $C_{1-12}$-alkyl substituent. $R^2$ and $R^3$ can have the same meaning as $R^1$, except that $R^2$ and $R^3$ can not be hydrogen at the same time.

$C_{1-12}$-alkyl can be branched or unbranched. Examples of $C_{1-12}$-alkyl are methyl, ethyl, propyl, isopropyl, butyl, isobutyl, tert-butyl, pentyl, hexyl, heptyl, octyl, nonyl, decyl, undecyl and dodecyl. An example of a $C_{2-12}$-alkenyl is allyl. Examples of aryl are phenyl, naphthyl, indolyl, imidazolyl, 1,3,5-triazinyl and pyridyl. Examples of $C_{4-8}$-cycloalkyl are cyclopentyl and cyclohexyl. Examples of halogen are chlorine and bromine.

Preferably, $R^1$ is $C_{1-12}$-alkyl, $C_{2-12}$-alkenyl, aryl or $C_{4-8}$-cycloalkyl, wherein $C_{1-12}$-alkyl, $C_{2-12}$-alkenyl, aryl and $C_{4-8}$-cycloalkyl can be unsubstituted or substituted with one or more $C_{1-12}$-alkyl, aryl, $C_{4-8}$-cycloalkyl, —O—$C_{1-12}$-alkyl, hydroxyl, amino, —COOH, —C(O)—$NH_2$, —OC(O)$R^2$ and/or —C(O)—$OR^3$, provided $C_{1-12}$-alkyl and $C_{2-12}$-alkenyl are not substituted with $C_{1-12}$-alkyl, aryl is not substituted with aryl and $C_{4-8}$-alkyl is not substituted with $C_{4-8}$-alkyl, and wherein a $C_{1-12}$-alkyl or aryl substituent can additionally be substituted with one or more —$C_{1-12}$-alkyl, —O—$C_{1-12}$-alkyl, hydroxyl, amino, —COOH, —C(O)—$NH_2$, —OC(O)$R^2$ and/or —O(O)—$OR^3$, provided an $C_{1-12}$-alkyl substitutent is not additionally substituted with a $C_{1-12}$-alkyl substituent More preferably, $R^1$ is $C_{1-12}$-alkyl, aryl or $C_{4-8}$-cycloalkyl, wherein $C_{1-12}$-alkyl, aryl and $C_{4-8}$-cycloalkyl can be unsubstituted or substituted with one or more $C_{1-12}$-alkyl, aryl, —O—$C_{1-12}$-alkyl, hydroxyl, amino, and/or —COOH, provided $C_{1-12}$-alkyl is not substituted with $C_{1-12}$-alkyl, aryl is not substituted with aryl, and wherein a $C_{1-12}$-alkyl or aryl substituent can additionally be substituted with one or more —$C_{1-12}$-alkyl, —O—$C_{1-12}$-alkyl, hydroxyl, amino, and/or —COOH, provided an $C_{1-12}$-alkyl substitutent is not additionally substituted with a $C_{1-12}$-alkyl substituent Examples of aldehydes are formaldehyde, acetaldehyde, propanal, butanal, pentanal, hexanal, benzaldehyde, salicylaldehyde and phenylacetaldehyde.

Ketones can be of formula $R^4$—C(O)—$R^5$, wherein $R^4$ and $R^5$ can have the same meaning as $R^1$, with the exception that $R^4$ and $R^5$ can not be hydrogen, and in addition, $R^4$ and $R^5$ can, together with the carbon of the C(O)-group, form a 5 to 8 membered carbon cycle, where a $CH_2$-group of the carbon cycle can also be replaced by oxygen or a OC(O)-group, and which cycle can be unsubstituted or substituted with one or more $C_{1-12}$-alkyl, $C_{2-12}$-alkenyl, aryl, $C_{4-8}$-cycloalkyl, —O—$C_{1-12}$-alkyl, hydroxyl, halogen, amino, —NH—C(=NH)—$NH_2$, —SH, —S—$C_{1-12}$-alkyl, —COOH, —C(O)—$NH_2$, —OC(O)$R^2$ and/or —O(O)—$OR^3$, wherein a $C_{1-12}$-alkyl or aryl substituent can additionally be substituted with $C_{1-12}$-alkyl, —O—$C_{1-12}$-alkyl, hydroxyl, halogen, amino, —NH—C(=NH)—$NH_2$, —SH, —S—$C_{1-12}$-alkyl, —COOH, —C(O)—$NH_2$, —OC(O)$R^2$ and/or —C(O)—$OR^3$, provided an $C_{1-12}$-alkyl substitutent is not additionally substituted with a $C_{1-12}$-alkyl substituent.

Preferably, the cycle is unsubstituted or substituted with one or more $C_{1-12}$-alkyl, aryl, $C_{4-8}$-cycloalkyl, —O—$C_{1-12}$-alkyl, hydroxyl, amino, —COOH, —C(O)—$NH_2$, —OC(O)$R^2$ and/or —C(O)—$OR^3$, wherein a $C_{1-12}$-alkyl or aryl substituent can additionally be substituted with one or more —$C_{1-12}$-alkyl, —O—$C_{1-12}$-alkyl, hydroxyl, halogen, amino, —COOH, —C(O)—$NH_2$, —OC(O)$R^2$ and/or —C(O)—$OR^3$, provided a $C_{1-12}$-alkyl substitutent is not additionally substituted with a $C_{1-12}$-alkyl substituent.

More preferably, the cycle is unsubstituted or substituted with one or more $C_{1-12}$-alkyl, aryl, —O—$C_{1-12}$-alkyl, hydroxyl, amino and/or —COOH, wherein a $C_{1-12}$-alkyl or aryl substituent can additionally be substituted with one or more —$C_{1-12}$-alkyl, —O—$C_{1-12}$-alkyl, hydroxyl, amino and/or —COOH, provided an $C_{1-12}$-alkyl substitutent is not additionally substituted with a $C_{1-12}$-alkyl substituent Examples of ketones are acetone, butanone, 2-pentanone, 3-pentanone, 3-methyl-2-butanone, 1-phenyl-2-propanone, acetophenone, benzophenone and ascorbic acid (vitamin C).

Aldehydes and ketones can also be present in form of a hemiacetal, respectively, hemiketal. Hemiacetals and hemiketals can be formed from the respective aldehyde and ketal by reaction with one equivalent of an alcohol. The alcohol can be of formula $R^6$–OH. $R^6$ can have the same meaning as $R^4$ or $R^5$.

Examples of alcohols are methanol, ethanol, isopropanol, propanol, butanol, pentanol, phenol, benzylalcohol and cyclohexanol. If $R^1$, $R^4$ or $R^5$ contain a hydroxyl substituent, it is also possible that the hemiacetal or hemiketal is formed internally.

Reducing carbohydrates are capable of reducing Tollens' reagent. Examples of reducing carbohydrates are aldoses, ketoses, reducing disaccharides and reducing polysaccharides.

Examples of aldoses are glycerinaldehyde, erythrose, threose, arabinose, ribose, xylose, lyxose, glucose, mannose, allose, altrose, gulose, idose, galactose and talose.

Examples of ketoses are dihydroxyacetone, erythrulose, ribulose, xylulose, fructose, sorbose and tagatose.

Examples of reducing dissacharides are maltose, cellubiose and lactose.

Preferred compounds containing a free carbonyl group are aldehydes, ketones, aldoses, ketoses and reducing disaccharides. More preferred compounds containing a free carbonyl group are ketones and aldoses.

In particular, preferred compounds containing a free carbonyl group are physiologically acceptable for humans, for example ascorbic acid, glucose, lactose and maltose.

Most preferred compounds containing a free carbonyl group are ascorbic acid and glucose, in particular glucose.

The nucleophile can be any nucleophile capable of reacting with the free carbonyl group of the compound containing the free carbonyl group. For example, the nucleophile can be an amine.

Examples of amines are proteines and, preferably, amines of formula $NR^7R^8R^9$, wherein $R^7$, $R^8$ and $R^9$ can be the same or different, and can be hydrogen, $C_{1-30}$-alkyl, $C_{2-12}$-alkenyl, aryl, $C_{4-8}$-cycloalkyl or —C(=NH)—NH$_2$, wherein one or more CH$_2$-group of $C_{1-30}$-alkyl or $C_{4-8}$-cyclo-alkyl can also be replaced by oxygen, and wherein $C_{1-20}$-alkyl, $C_{2-12}$-alkenyl, aryl and $C_{4-8}$-cycloalkyl can be unsubstituted or substituted with one or more $C_{1-12}$-alkyl, $C_{2-12}$-alkenyl, aryl, $C_{4-8}$-cycloalkyl, —O—$C_{1-12}$-alkyl, hydroxyl, amino, —NH—C(=NH)—NH$_2$, —SH, —S—$C_{1-12}$-alkyl, —COOH, —C(O)—NH$_2$, —C(O)—NHR$^{10}$R$^{11}$, —OC(O)R$^2$ and/or —O(O)—OR$^3$, provided $C_{1-30}$-alkyl and $C_{2-12}$-alkenyl are not substituted with $C_{1-12}$-alkyl or $C_{2-12}$-alkenyl, aryl is not substituted with aryl and $C_{4-8}$-alkyl is not substituted with $C_{4-8}$-alkyl, and wherein a $C_{1-12}$-alkyl or aryl substituent can additionally be substituted with one or more $C_{1-12}$-alkyl, —O—$C_{1-12}$-alkyl, hydroxyl, halogen, amino, —N—C(=NH)—NH$_2$, —SH, —S—$C_{1-12}$-alkyl, —COOH, —C(O)—NH$_2$, —OC(O)R$^2$ and/or —O(O)—OR$^3$, provided a $C_{1-12}$-alkyl substitutent is not additionally substituted with a $C_{1-12}$-alkyl substituent, or $R^7$ can be hydrogen, and $R^8$ and $R^9$ can be —(CH$_2$)$_n$—, which n being an integer from 4 to 7, and together with the nitrogen of the amine form a 5 to 8 membered cycle, wherein a CH$_2$-group of the cycle can also be replaced by oxygen, and which cycle can be unsubstituted or substituted with one or more $C_{1-12}$-alkyl, $C_{2-12}$-alkenyl, aryl, $C_{4-8}$-cycloalkyl, —O—$C_{1-12}$-alkyl, hydroxyl, halogen, amino, —NH—C(=NH)—NH$_2$, —SH, —S—$C_{1-12}$-alkyl, —COOH, —C(O)—NH$_2$, —OC(O)R$^2$ and/or —C(O)—OR$^3$.

$R^{10}$ and $R^{11}$ can be hydrogen, $C_{1-12}$-alkyl, aryl or $C_{4-8}$-cycloalkyl, which $C_{1-12}$-alkyl, aryl or $C_{4-8}$-cycloalkyl can be unsubstituted or substituted with one or more $C_{1-12}$-alkyl, aryl, —O—$C_{1-12}$-alkyl, hydroxyl, amino and/or —COOH, provided $C_{1-12}$-alkyl is not substituted with $C_{1-12}$-alkyl, and aryl is not substituted with aryl. Preferably, $R^{10}$ and $R^{11}$ are hydrogen or $C_{1-12}$-alkyl, which $C_{1-12}$-alkyl can be unsubstituted or substituted with one or more —COOH.

$C_{1-30}$-alkyl can be branched or unbranched. Examples of $C_{1-30}$-alkyl are methyl, ethyl, propyl, isopropyl, butyl, isobutyl, tert-butyl, pentyl, hexyl, heptyl, octyl, nonyl, decyl, undecyl, dodecyl, myristyl and palmityl.

Examples of amines of formula $NR^7R^8R^9$ are ammonia, tris(hydroxymethyl)aminomethane, guanidine, methylamine, ethylamine, propylamine, butylamine, diethylamine, ethylene diamine, 1,2-diaminopropane, ethanolamine, triethanolamine, cyclohexylamine, aniline, melamine, pyrrole, morpholine, pyrrolidine, piperidine and polyetheramines such as those sold by Huntsmann under the tradename Jeffamine®, for example Jeffamine® D-230, which is a polypropyleneglycol carrying two terminal amino groups and having a molecular weight of 230 g/mol.

Further examples of amines of formula $NR^7R^8R^9$ are amino acids and amino sugars.

Examples of aminoacids are 4-aminohippuric acid and 4-aminobenzoic acid and the "standard" amino acids, which are glycine, alanine, valine, leucine, isoleucine, proline, phenylalanine, tyrosine, tryphthophane, cysteine, methionine, serine, threonine, lysine, arginine, histidine, aspartic acid, glutamic acid, asparagine and glutamine.

Amino sugars are carbohydrates which contain an amino group in place of a hydroxyl group, which is not the glycosidic hydroxyl group. Examples of amino sugars are glucosamine and galactosamine.

Preferably, $R^7$, $R^8$ and $R^9$ are the same or different, and are hydrogen, $C_{1-30}$-alkyl, $C_{2-12}$-alkenyl, aryl or $C_{4-8}$-cycloalkyl, wherein one or more CH$_2$-groups of $C_{1-30}$-alkyl or $C_{4-8}$-cycloalkyl can also be replaced by oxygen, and wherein $C_{1-20}$-alkyl, $C_{2-12}$-alkenyl, aryl and $C_{4-8}$-cycloalkyl can be unsubstituted or substituted with one or more $C_{1-12}$-alkyl, aryl, $C_{4-8}$-cycloalkyl, —O—$C_{1-12}$-alkyl, hydroxyl, amino, —NH—C(=NH)—NH$_2$, —SH, —S—$C_{1-12}$-alkyl, —COOH, —C(O)—NH$_2$, —C(O)—NHR$^{10}$R$^{11}$, —OC(O)R$^2$ and/or —O(O)—OR$^3$, provided $C_{1-30}$-alkyl and $C_{2-12}$-alkenyl are not substituted with $C_{1-12}$-alkyl or $C_{2-12}$-alkenyl, aryl is not substituted with aryl and $C_{4-8}$-alkyl is not substituted with $C_{4-8}$-alkyl, and wherein a $C_{1-12}$-alkyl or aryl substituent can additionally be substituted with one or more $C_{1-12}$-alkyl, —O—$C_{1-12}$-alkyl, hydroxyl, amino, —COOH, —C(O)—NH$_2$, —OC(O)R$^2$ and/or —C(O)—OR$^3$, provided a $C_{1-12}$-alkyl substitutent is not additionally substituted with a $C_{1-12}$-alkyl substituent, or $R^7$ can be hydrogen, and $R^8$ and $R^9$ can be —(CH$_2$)$_n$—, which n being an integer from 4 to 7, and together with the nitrogen of the amine form a 5 to 8 membered cycle, where a CH$_2$-group of the cycle can also be replaced by oxygen, and which cycle can be unsubstituted or substituted with one or more $C_{1-12}$-alkyl, —O—$C_{1-12}$-alkyl, hydroxyl, amino, —COOH, —C(O)—NH$_2$, —OC(O)R$^2$ and/or —C(O)—OR$^3$.

More preferably, $R^7$, $R^8$ and $R^9$ are the same or different, and are hydrogen, $C_{1-30}$-alkyl, aryl or $C_{4-8}$-cycloalkyl, wherein one or more CH$_2$-groups of $C_{1-30}$-alkyl or $C_{4-8}$-cycloalkyl can also be replaced by oxygen, and wherein $C_{1-20}$-alkyl, aryl and $C_{4-8}$-cycloalkyl can be unsubstituted or substituted with one or more $C_{1-12}$-alkyl, aryl, $C_{4-8}$-cycloalkyl, —O—$C_{1-12}$-alkyl, hydroxyl, amino, —NH—C(=NH)—NH$_2$, —SH, —S—$C_{1-12}$-alkyl, —COOH, —C(O)—NH$_2$ and/or —C(O)—NHR$^{10}$R$^{11}$, provided $C_{1-30}$- alkyl is not substituted with $C_{1-12}$-alkyl, aryl is not substituted with aryl and $C_{4-8}$-alkyl is not substituted with $C_{4-8}$-alkyl, and wherein a $C_{1-12}$-alkyl or aryl substituent can additionally be substituted with one or more $C_{1-12}$-alkyl, —O—$C_{1-12}$-alkyl, hydroxyl, amino and/or —COOH, provided a $C_{1-12}$-alkyl substitutent is not additionally substituted with a $C_{1-12}$-alkyl substituent, or $R^7$ can be hydrogen, and $R^8$ and $R^9$ can be —$(CH_2)_n$—, which n being an integer from 4 to 7, and together with the nitrogen of the amine form a 5 to 8 membered cycle, where a $CH_2$-group of the cycle can also be replaced by oxygen, and which cycle can be unsubstituted or substituted with one or more $C_{1-12}$-alkyl, —O—$C_{1-12}$-alkyl, hydroxyl, amino and/or —COOH.

Most preferably, $R^7$, $R^8$ and $R^9$ are the same or different, and are hydrogen, $C_{1-30}$-alkyl, aryl or $C_{4-8}$-cycloalkyl, wherein one or more $CH_2$-groups of $C_{1-30}$-alkyl or $C_{4-8}$-cycloalkyl can also be replaced by oxygen, and wherein $C_{1-20}$-alkyl, aryl and $C_{4-8}$-cycloalkyl can be unsubstituted or substituted with one or more $C_{1-12}$-alkyl, aryl, $C_{4-8}$-cycloalkyl, —O—$C_{1-12}$-alkyl, hydroxyl, amino, —NH—C(=NH)—NH$_2$, —SH, —S—$C_{1-12}$-alkyl, —COOH, —C(O)—NH$_2$ and/or —C(O)—NHR$^{10}$R$^{11}$, provided $C_{1-30}$-alkyl is not substituted with $C_{1-12}$-alkyl, aryl is not substituted with aryl and $C_{4-8}$-alkyl is not substituted with $C_{4-8}$-alkyl, and wherein a $C_{1-12}$-alkyl or aryl substituent can additionally be substituted with one or more hydroxyl, or $R^7$ can be hydrogen, and $R^8$ and $R^9$ can be —$(CH_2)_n$—, which n being an integer from 4 to 7, and together with the nitrogen of the amine form a 5 to 8 membered cycle, where a $CH_2$-group of the cycle can also be replaced by oxygen, and which cycle can be unsubstituted or substituted with one or more —COOH.

Preferred amines of formula NR$^7$R$^8$R$^9$ are amino acids and amino sugars. More preferred amines of formula NR$^7$R$^8$R$^9$ are the "standard" amino acids and amino sugars, and the most preferred amines of formula NR$^7$R$^8$R$^9$ are proline, histidine, alanine, glycine and glucosamine.

Particular preferred nucleophiles are amines that are physiologically acceptable for humans.

The molar ratio of the compound containing a free carbonyl group/nucleophile in the composition of the present invention can be in the range of 10/1 to 1/10, preferably 5/1 to 1/5, more preferably 2/1 to 1/2. Most preferably, the compound containing a free carbonyl group and the nucleophile are present in the composition in about equimolar amounts.

Any compound containing a free carbonyl group, which compound is substituted with one or more nucleophilic groups can be used, for example the compound containing a free carbonyl group, which compound is substituted with one or more nucleophilic groups, can be any of the compounds containing a free carbonyl group listed above, except that it is substituted with one or more nucleophilic groups. Preferred nucleophilic groups are amino groups. Examples of compounds containing a free carbonyl group, which compound is substituted with one or more amino groups, are amino sugars. Examples of amino sugars are listed above.

The composition can also comprise a solvent. The solvent can be water, an organic solvent, a liquid monomer or mixtures thereof. Preferably, the solvent is water, an organic solvent or mixtures thereof.

Examples of organic solvents are $C_{1-4}$-alkanols, $C_{2-4}$-polyols, $C_{3-6}$-ketones, $C_{4-6}$-ethers, $C_{2-3}$-nitriles, nitromethane, dimethylsulfoxide, dimethylformamide, dimethylacetamide, N-methyl pyrolidone and sulfolane, whereby $C_{1-4}$-alkanols and $C_{2-4}$-polyols may be substituted with $C_{1-4}$-alkoxy. Examples of $C_{1-4}$-alkanols are methanol, ethanol, propanol, isopropanol or butanol, isobutanol, sec-butanol and tert-butanol. Examples of a $C_{1-4}$-alkoxy-derivatives thereof are 2-ethoxyethanol and 1-methoxy-2-propanol. Examples of $C_{2-4}$-polyols are glycol and glycerol. Examples of $C_{3-6}$-ketones are acetone and methyl ethyl ketone. Examples of $C_{4-6}$-ethers are dimethoxyethane, diisopropylethyl and tetrahydrofurane. An example of a $C_{2-3}$-nitrile is acetonitrile.

More preferably, the solvent is water or a mixture of water and an organic solvent.

Preferably, the organic solvent is selected from the group consisting of $C_{1-4}$-alkanols, $C_{2-4}$-polyols, $C_{3-6}$-ketones, dimethylformamide and dimethylacetamide, whereby $C_{1-4}$-alkanols and $C_{2-4}$-polyols may be substituted with $C_{1-4}$-alkoxy.

Preferably, the ratio of water/organic solvent of the mixture of water and organic solvent is at least 0.5/1, and more preferably, at least 1/1.

Most preferably, the solvent is water.

Preferably, the composition of the present invention also comprises a polymeric binder.

Examples of polymeric binders are acrylic polymers, styrene polymers and hydrogenated products thereof, vinyl polymers and derivatives thereof, polyolefins and hydrogenated or epoxidized products thereof, aldehyde polymers, epoxide polymers, polyamides, polyesters, polyurethanes, sulfone-based polymers and natural polymers and derivatives thereof. The polymeric binder can also be a mixture of polymeric binders. It also can be a mixture of liquid monomers and a suitable photoinitiator that forms one of the above listed polymeric binders under UV irradiation after coating. In this case, the monomers function as the solvent.

Acrylic polymers can be polymers formed from at least one acrylic monomer or from at least one acrylic monomer and at least one other ethylenically unsaturated polymer such as a styrene monomer, vinyl monomer, olefin monomer or maleic monomer.

Examples of acrylic monomers are (meth)acrylic acid or salts thereof, (meth)acrylamide, (meth)acrylonitrile, $C_{1-6}$-alkyl (meth)acrylates such as ethyl (meth)acrylate, butyl (meth)acrylate or hexyl (meth)acrylate, 2-ethylhexyl (meth)acrylate, substituted $C_{1-6}$-alkyl (meth)acrylates such as glycidyl methacrylate and acetoacetoxyethyl methacrylate, di($C_{1-4}$-alkylamino)$C_{1-6}$-alkyl (meth)acrylates such as dimethylaminoethyl acrylate or diethylaminoethyl acrylate, amides formed from $C_{1-6}$-alkylamines, substituted $C_{1-6}$-alkylamines such as 2-amino-2-methyl-1-propane sulfonic acid, ammonium salt, or di($C_{1-4}$-alkylamino)$C_{1-6}$-alkylamines and (meth)acrylic acid and $C_{1-4}$-alkyl halide adducts thereof.

Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluroethylene. Examples of maleic monomers are maleic acid, maleic anhydride and maleimide.

Examples of acrylic polymers are poly(methyl methacrylate) and poly(butyl methacrylate), polyacrylic acid, styrene/2-ethylhexyl acrylate copolymer, styrene/acrylic acid copolymer, and acrylic core shell polymers, for example as sold under the tradename Ciba® Glascol® LS 26, which is a core shell polymer consisting of 70 weight parts 55/45 (w/w) styrene/2-ethylhexyl acrylate copolymer, which functions as the core polymer, and 30 weight parts of styrene/acrylic acid copolymer, which functions as the shell polymer.

Styrene polymers can be polymers formed from at least one styrene monomer and at least one vinyl monomer, olefin monomer and/or maleic monomer. Examples of styrene polymers are styrene butadiene styrene block polymers, styrene ethylene butadiene block polymers, styrene ethylene propylene styrene block polymers and styrene-maleic anhydride copolymers.

Vinyl polymers can be polymers formed from at least one vinyl monomer or from at least one vinyl monomer and at least one olefin monomer or maleic monomer. Examples of vinyl polymers are polyvinyl chloride, polyvinylalcohol, polyvinylacetate, partially hydrolysed polyvinyl acetate and methyl vinyl ether-maleic anhydride copolymers. Examples of derivatives thereof are carboxy-modified polyvinyl alcohol, acetoacetyl-modified polyvinyl alcohol, diacetone-modified polyvinyl alcohol and silicon-modified polyvinyl alcohol.

Polyolefins can be polymers formed from at least one olefin monomer or from at least one olefin monomer or maleic monomer. Examples of polyolefines are polyethylene, polypropylene, polybutadiene and isopropylene-maleic anhydride copolymer Aldehyde polymers can be polymers formed from at least one aldehyde monomer or polymer and at least one alcohol monomer or polymer, amine monomer or polymer and/or urea monomer or polymer. Examples of aldehyde monomers are formaldehyde, furfural and butyral. Examples of alcohol monomers are phenol, cresol, resorcinol and xylenol. An example of polyalcohol is polyvinyl alcohol. Examples of amine monomers are aniline and melamine. Examples of urea monomers are urea, thiurea and dicyandiamide. An example of an aldehyde polymer is polyvinyl butyral formed from butyral and polyvinylalcohol.

Epoxide polymers can be polymers formed from at least one epoxide monomer and at least one alcohol monomer and/or amine monomer. Examples of epoxide monomers are epichlorhydrine and glycidol. Examples of alcohol monomers are phenol, cresol, resorcinol, xylenol, bisphenol A and glycol. An example of epoxide polymer is phenoxy resin, which is formed from epichlorihydrin and bisphenol A.

Polyamides can be polymers formed from at least one monomer having an amide group or an amino as well as a carboxy group or from at least one monomer having two amino groups and at least one monomer having two carboxy groups. An example of a monomer having an amide group is caprolactam. An example of a diamine is 1,6-diaminohexane. Examples of dicarboxylic acids are adipic acid, terephthalic acid, isophthalic acid and 1,4-naphthalene-dicarboxylic acid. Examples of polyamides are poyhexamethylene adipamide and polycaprolactam.

Polyesters can be polymers formed from at least one monomer having an hydroxy as well as a carboxy group or from at least one monomer having two hydroxy groups and at least one monomer having two carboxy groups or a lactone group. An example of a monomer having a hydroxy as well as a carboxy group is adipic acid. An example of a diol is ethylene glycol. An example of a monomer having a lactone group is carprolactone. Examples of dicarboxylic acids are terephthalic acid, isophthalic acid and 1,4-naphthalenedicarboxylic acid. An example of a polyester is polyethylene terephthalate. So-called alkyd resins are also regarded to belong to polyester polymers.

Polyurethane can be polymers formed from at least one diisocyanate monomer and at least one polyol monomer and/or polyamine monomer. Examples of diisocyanate monomers are hexamethylene diisocyanate, toluene diisiocyanate and diphenylmethane diisocyanate.

Examples of sulfone-based polymers are polyarylsulfone, polyethersulfone, polyphenylsulfone and polysulfone. Polysulfone is a polymer formed from 4,4-dichlorodiphenyl sulfone and bisphenol A.

Examples of natural polymers are starch, cellulose, gelatine, caesin and natural rubber. Examples of derivatives are oxidised starch, starch-vinyl acetate graft copolymers, hydroxyethyl cellulose, hydroxypropyl cellulose, methyl cellulose, ethyl cellulose, carboxymethyl cellulose and acetyl cellulose.

The polymeric binders are known in the art and can be produced by known methods, e.g. by polymerisation starting from suitable monomers.

Preferably, the polymeric binder is selected from the group consisting of acrylic polymers, styrene polymers, vinyl polymers and derivatives thereof, polyolefins, polyurethanes and natural polymers and derivatives thereof.

More preferably, the polymeric binder is selected from the group consisting of acrylic polymers, styrene butadiene copolymers, styrene-maleic anhydride copolymers, polyvinyl alcohol, polyvinyl acetate, partially hydrolysed polyvinyl acetate, methyl vinyl ether-maleic anhydride copolymers, carboxy-modified polyvinyl alcohol, acetoacetyl-modified polyvinyl alcohol, diacetone-modified polyvinyl alcohol and silicon-modified polyvinyl alcohol, isopropylene-maleic anhydride copolymer, polyurethane, cellulose, gelatine, caesin, oxidised starch, starch-vinyl acetate graft copolymers, hydroxyethyl cellulose, methyl cellulose, ethyl cellulose, carboxymethyl cellulose and acetyl cellulose.

Even more preferably, the polymeric binder is a polyvinylalcohol, for example PVA 6-98 or PVA 28-98, a cellulose derivative or an acrylic polymer, and most preferably, it is an acrylic polymer and in particular, an acrylic polymer as sold for example by Ciba under the tradename Ciba® Glascol® such as Ciba® Glascol® LE510, LE520, LE530, LE15, LE29, LE28, LE17, LS16, LS2, LS20, LS24, LS26, LS27, LS28, C44, C47, HA2, HA4 or Ciba® Surcol® such as Ciba® Surcol® 836 or 860.

The polymeric binders are known in the art and can be produced by known methods, e.g. by polymerisation starting from suitable monomers.

The composition of the present invention can also comprise a catalyst. The catalyst facilitates the reaction between the compound containing the free carbonyl group and the nucleophile.

The catalyst can be an inorganic or organic acid or a salt thereof.

Examples of inorganic acids are sulfuric acid, sulfamic acid, sulfurous acid, formamidine-sulfinic acid, nitric acid, hydrochloric acid, phosphoric acid, polyphosphoric acid and phosphorous acid. Examples of organic acids are sulfur-based organic acids such as 4-styrenesulfonic acid, p-toluenesulfonic acid, poly(4-styrene sulfonic acid) and coplymers comprising 4-styrene sulfonic acid units such as poly(4-styrenesulfonic acid-co-maleic acid), phosphor-based organic acids such as phenyl phosphonic acid, methane phosphonic acid, phenyl phosphinic acid, diethylenetriamine penta(methylenephosphonic acid) (DTPMP), hexamethylenediamine tetra(methylenephosphonic acid) (HDTMP), nitrilotris(methylene phosphonic acid) and 1-hydroxyethylidene diphosphonic acid, and carboxylic acids such as carbonic acid, 2,4-hexadienoic acid (sorbic acid), citric acid, tartaric acid, oxalic acid and maleic acid.

Salts thereof can be metal salts, for example a transition metal salt, alkali metal salts or alkaline earth metal salts, or ammonium salts and substituted ammonium salts. Examples of transition metal salts are iron and cobalt. Examples of alkali metals are sodium and potassium. Examples of alkaline earth metals are calcium and magnesium.

Preferred catalysts are phosphoric acids, hydrochloric acids and carboxylic acids and salts thereof. More preferred acidic catalysts are phosphoric acid, hydrochloric acid, carbonic acid, citric acid and 2,4-hexadienoic acid (sorbic acid) and salts thereof, in particular ammonium phosphate, iron (III) chloride, ammonium carbonate, sodium carbonate, sodium citrate and 2,4-hexadienoic acid (sorbic acid).

The composition of the present invention can also comprise additional components.

The additional components that may be included in the coating composition can be any component suitable for improving the performance of the composition. The additional component can be a component that can absorb the incident energy and transfer this energy to the system thermally or otherwise such as UV absorber or IR absorber. Examples of other types of additional components are bases or acids to adjust the pH of the composition, pigments, stabilizers, antioxidants, rheology modifiers, wetting agents, biocides, smoke suppressants, char forming compounds and taggants. Taggants are various substances added to a product to indicate its source of manufacture.

Preferably, the coating composition does not contain a dye or colour former.

An example of a UV absorber is 2-hydroxy-4-methoxy-benzophenone.

IR absorbers can be organic or inorganic. Examples of organic IR absorbers are alkylated triphenyl phosphorothionates, for example as sold under the trade name Ciba® Irgalube® 211 or Carbon Black, for example as sold under the trade names Ciba® Microsol® Black 2B or Ciba® Microsol® Black C-E2.

Examples of inorganic IR absorbers are oxides, hydroxides, sulfides, sulfates and phosphates of metals such as copper, bismuth, iron, nickel, tin, zinc, manganese, zirconium and antimony, including antimony(V) oxide doped mica and tin(IV) oxide doped mica, Examples of suitable bases for pH adjustment are ammonia and sodium hydroxide. Examples of suitable acids for pH adjustment are hydrochloric acid, phosphoric acid and acetic acid.

Pigments can be added as inorganic IR absorbers, for enhanced contrast between unimaged and imaged areas or as a security feature.

Examples of pigments which function as inorganic IR absorbers are kaolin, calcined kaolin, mica, aluminum oxide, aluminum hydroxide, aluminum silicates, talc, amorphous silica and colloidal silicon dioxide.

Examples of pigments which can be added for enhanced contrast between unimaged and imaged area are titan dioxide, calcium carbonate, barium sulfate, polystyrene resin, urea-formaldehyde resin, hollow plastic pigment.

Examples of pigments which can be added as a security feature are fluorescent pigments or magnetic pigments.

Examples of rheology modifiers are xanthan gum, methylcellulose, hydroxypropyl methyl-cellulose, or acrylic polymers such as sold under the tradenames Ciba® Rheovis® 112, Ciba® Rheovis® 132 and Ciba® Rheovis® 152.

An example of a wetting agent is Ciba® Irgaclear® D, a sorbitol based clarifying agent.

Examples of biocides are Acticide® MBS, which includes a mixture of chloromethyl isothiazolinone and methyl isothiazolinone, Biocheck® 410, which includes a combination of 2-dibromo-2,4-dicyanobutane and 1,2-benzisothiazolin-3-one, Biochek®721M, which includes a mixture of 1,2-dibromo-2,4-dicyanobutane and 2-bromo-2-nitro-1,3-propandiol and Metasol®TK 100, which includes 2-(4-thiazolyl)-benzimidazole.

An example of a smoke suppressant is ammonium octamolybdate.

Examples of char forming compounds are carbohydrates such as monosaccharides, disaccharides and polysaccharides, and derivatives thereof wherein the carbonyl group has been reduced to a hydroxyl group, so-called sugar alcohols. A particular preferred char forming compound is saccharose.

The coatings formed by the coating compositions of the present invention can be coated with a laminate layer or overprint varnish, which reduces emission during the imaging process. If the material of the laminate layer or the overprint varnish is selected so that it does not absorb at the wavelength of the imaging laser then the laser sensitive coating can be imaged through the laminate layer without damaging or marking the laminate. Also the laminate or overprint varnish is ideally chosen that it does not result in colouration of the coating before the energy treatment.

The composition of the present invention can comprise 1 to 50%, preferably 1 to 40%, more preferably, 1 to 30%, most preferably 1 to 25% by weight of the compound containing the free carbonyl group or of the compound containing a free carbonyl group as well as a nucleophilic group based on the weight of the total composition.

The composition of the present invention can comprise 1 to 50%, preferably 1 to 40%, more preferably, 1 to 30%, most preferably 1 to 25% by weight of the nucleophile based on the weight of the total composition.

The composition of the present invention can comprise 1 to 80%, preferably 1 to 70%, more preferably 1 to 60% and most preferably 1 to 30%, by dry weight of the polymeric binder based on the weight of the total composition.

The composition of the present invention can comprise 10 to 95%, preferably 10 to 90%, and more preferably 10 to 80% and most preferably 10 to 70% by weight of the solvent based on the weight of the total composition.

The composition of the present invention can comprise 0 to 50%, preferably 0 to 40%, more preferably 0 to 30% and most preferably 0 to 20%, by weight of the catalyst compound based on the weight of the total composition.

The composition of the present invention can comprise 0 to 40%, preferably 0 to 30%, more preferably 0 to 20% by weight of additional components based on the weight of the total composition.

Also part of the invention is a process for preparing the composition of the present invention which process comprises (i) a) mixing the compound containing the free carbonyl group and b) the nucleophile with the solvent or (ii) mixing the compound containing a free carbonyl group, which is substituted with one or more nucleophilic groups, with the solvent.

The compound containing the free carbonyl group can also be prepared in-situ, for example by oxidation of the corresponding alcohol.

Preferably, the process comprises mixing the compound containing the free carbonyl group, the nucleophile, the polymeric binder and the solvent.

Also part of the invention is a substrate coated with the coating composition of the present invention.

The substrate can be a sheet or any other three dimensional object, it can be transparent or opaque and it can have an even or uneven surface. An example of a substrate having an uneven surface is a filled paper bag, such as a paper bag of cement. The substrate can be made from paper, cardboard, metal, wood, textiles, glass, ceramics and/or polymers. The substrate can also be a pharmaceutical tablet or foodstuff. Examples of polymers are polyethylene terephthalate, low density-polyethylene, polypropylene, biaxially orientated polypropylene, polyether sulfone, polyvinyl chloride polyester and polystyrene. Preferably, the substrate is made from paper, cardboard or polymer.

If the substrate does not absorb IR irradiation, for example if the substrate is polyester film, it can be advisable to include an IR absorber or a pigment that acts as an IR absorber into the coating composition.

The thickness of the coating usually chosen is in the range of 0.1 to 1000 µm. Preferably, it is in the range of 1 to 500 µm. More preferably, it is in the range of 1 to 200 µm. Most preferably, it is in the range of 1-20 µm.

Another aspect of the present invention is a process for preparing a coated substrate, which comprises the step of coating a substrate with the composition of the present invention.

The substrate can be coated with the composition of the present invention by using a standard coating application as such as a bar coater application, rotation application, spray application, curtain application, dip application, air application, knife application, blade application or roll application. The composition can also be applied to the substrate by various printing methods such as silk screen printing, gravure printing, offset printing and flexo printing. If the substrate is paper, the composition can also be applied in the size press or in the wet-end section of the paper machine.

The coating composition can be dried, for example at ambient or elevated temperature. The elevated temperature is ideally chosen to avoid image formation before exposure to the energy.

Also part of the invention is a process for preparing a marked substrate, which comprises the steps of i) coating a substrate with the composition of the present invention, and ii) exposing those parts of the coated substrate, where a marking is intended, to energy in order to generate a marking.

The energy can be heat or any other energy, which yields a marking when applied to the substrate coated with the composition of the present invention. Examples of such energy are UV, IR, visible or microwave irradiation.

The energy can be applied to the coated substrate in any suitable way, for example heat can be applied by using a thermal printer, and UV, visible and IR irradiation can be applied by using a UV, visible or IR laser. Examples of IR lasers are $CO_2$ lasers, Nd:YAG lasers and IR semiconductor lasers.

Preferably, the energy is IR irradiation. More preferably, the energy is IR irradiation having a wavelength in the range of 780 to 1'000'000 nm. Even more preferably, the energy is IR irradiation generated by a $CO_2$ laser or a Nd:YAG laser. Most preferably, the energy is IR irradiation generated by a $CO_2$ laser having a wavelength of 10'600 nm.

Typically the exact power of the IR laser and the line speed is determined by the application and chosen to be sufficient to generate the image, for example, when the wavelength of the IR laser is 10'600 nm and the diameter of the laser beam is 0.35 mm, the power is typically 0.5 to 4 W, and the line speed is typically 300 to 1'000 mm/s.

Yet another aspect of the invention is the marked substrate, which is obtained by above process.

Also part of the invention is the use of the composition of the present invention for the marking of data on packaging.

Also part of the invention is the use of the composition of the present invention for the marking of data on packaging in the security/track and trace field.

In the security/track and trace field, the composition can be coated onto a substrate and imaged using a high resolution laser to give very small codes that are invisible or nearly invisible to the human eye. The images could however be decoded with a device (for example digital camera/scanner, magnifying glass or camera equipped mobile phone) which would give a unique code. The specific high resolution image could be generated by a computer and could be in the form of a two dimensional barcode or other pattern. Once scanned, information could then be sent to a secure computer (wireless with mobile phone) which could then give specific information on authenticity, date of manufacture, location of manufacture etc. The high-resolution images are very difficult to reproduce using traditional printing methods.

The coating composition of the present invention has the advantage that it yields markings of high contrast on exposure to low energies. In addition, it is suitable for coating paper and can solely contain materials that are of low cost as well as physiologically acceptable for humans.

EXAMPLES

Example 1

Preparation of an Acrylic Binder

To a 1 liter resin pot fitted with mechanical stirrer, condenser, nitrogen inlet, temperature probe and feed inlets was placed 98.9 g water and 483.9 g Joncryl® 8078, a solution of an ammonium salt of a low molecular weight styrene acrylic copolymer. The contents were heated to 85° C. and degassed with nitrogen for 30 minutes. A monomer phase was prepared by mixing 192.5 g styrene with 157.5 g 2-ethylhexyl acrylate. An initiator feed was prepared by dissolving 1.97 g ammonium persulfate in 63.7 g water. When the reactor was at temperature and degassed, 0.66 g ammonium persulfate was added to the reactor. After 2 minutes the monomer and initiator feeds were started appropriate to a 3 and 4 hour feed respectively. The reactor contents were maintained at 85° C. throughout the feeds. After completion of the feeds, the reactor contents were held for a further 1 hour at 85° C. before being cooled down to below 40° C. at which point 0.9 g Acticide LG, a biocide containing chlorinated and non-chlorinated methyl isothiazolones, was added. This resulted in an emulsion polymer of 49.2% solids, pH 8.3 and a Brookfield RVT viscosity of 1100 cPs.

Example 2

Preparation of a Coating Composition Using D-(+)-Glucose and L-Proline

The composition is prepared by mixing 31.31 g of water with 40.25 g of the acrylic binder of example 1. 8.95 g of L-proline is then added followed by 14 g D-(+)-glucose. The emulsion is then stirred at room temperature for 30 minutes. The resulting coating composition is then applied by a coating bar (K1 to K5) onto the desired substrate (for example paper or polymer film) and imaged using a $CO_2$ IR laser to give orange markings of high contrast (0.5 to 4 watt, 100 to 1000 mm/s).

Example 3

Preparation of a Coating Composition Using D-(+)-Glucose and L-Histidine

The coating composition is prepared by mixing 31.31 g of water with 40.25 g of the styrene acrylic binder of example 1.

16.29 g of L-histidine monohydrochloride monohydrate is then added followed by 14 g D-(+)-glucose. The emulsion is then stirred at room temperature for 30 minutes. The resulting coating composition is then applied by a coating bar (K1 to K5) onto the desired substrate (for example paper or polymer film) and imaged using a $CO_2$ IR laser to give dark brown markings of high contrast (0.5 to 4 watt, 100 to 1000 mm/s).

Example 4

Preparation of a Coating Composition Using D-(+)-Glucose and D,L-Alanine

The coating composition is prepared by mixing 31.31 g of water with 40.25 g of the acrylic binder of example 1. 6.92 g of D,L-alanine is then added followed by 14 g D-(+)-glucose. The emulsion is then stirred at room temperature for 30 minutes. The resulting coating composition is then applied by a coating bar (K1 to K5) onto the desired substrate (for example paper or polymer film) and imaged using a $CO_2$ IR laser to give grey/brown markings of high contrast (0.5 to 4 watt, 100 to 1000 mm/s).

Example 5

Preparation of a Coating Composition Using D-(+)-Glucose and Glycine

The coating composition is prepared by mixing 31.31 g of water with 40.25 g of the acrylic binder of example 1. 5.83 g of glycine is then added followed by 14 g D-(+)-glucose. The emulsion is then stirred at room temperature for 30 minutes. The resulting coating composition is then applied by a coating bar (K1 to K5) onto the desired substrate (for example paper or polymer film) and imaged using a $CO_2$ IR laser to give orange markings of high contrast (0.5 to 4 watt, 100 to 1000 mm/s).

Example 6

Preparation of a Coating Composition Using D-(+)-Glucose and Ascorbic Acid (Vitamin C)

The coating composition is prepared by mixing 31.31 g of water with 40.25 g of the acrylic binder of example 1. 5.83 g of glycine is then added followed by 14 g ascorbic acid (vitamin C). The emulsion is then stirred at room temperature for 30 minutes. The resulting coating composition is then applied by a coating bar (K1 to K5) onto the desired substrate (for example paper or polymer film) and imaged using a $CO_2$ IR laser to give orange markings of high contrast (0.5 to 4 watt, 100 to 1000 mm/s).

Example 7

Preparation of a Coating Composition Using D-(+)-Glucose and Glycine, and in Addition Saccharose and Ammonium Phosphate Dibasic The coating composition is prepared by mixing 31.26 g of water with 40.25 g of the acrylic binder of example 1. 3.00 g of glycine is then added followed by 7 g D-(+)-glucose. 7.00 g of saccharose followed by 6.00 g ammonium phosphate dibasic is then added. The emulsion is then stirred at room temperature for 30 minutes. The resulting coating composition is then applied by a coating bar (K1 to K5) onto the desired substrate (for example paper or polymer film) and imaged using a $CO_2$ IR laser to give orange markings of high contrast (0.5 to 4 watt, 100 to 1000 mm/s).

Example 8

Preparation of a Coating Composition Using D-Glucosamine

The coating composition is prepared by mixing 42.2 g of water with 40 g of the acrylic binder of example 1. 15.0 g of D-glucosamine hydrochloride is then added followed by an appropriate amount of aqueous ammonia (25% by weight) in order to render the pH alkaline (above 7.0). The emulsion is then stirred at room temperature for 30 minutes. The resulting coating composition is then applied by a coating bar (K1 to K5) onto the desired substrate (for example paper or polymer film) and imaged using a $CO_2$ IR laser to give brown markings of high contrast (0.5 to 4 watt, 100 to 1000 mm/s).

Example 9

Preparation of a Coating Composition Using D-Glucosamine and in Addition Saccharose The coating composition is prepared by mixing 33.4 g of water with 40 g of the acrylic binder of example 1. 10.0 g of D-glucosamine hydrochloride and 15.00 g of saccharose are added followed by an appropriate amount of aqueous ammonia (25% by weight) in order to render the pH alkaline (above 7.0). The emulsion is then stirred at room temperature for 30 minutes. The resulting coating composition is applied by a coating bar (K1 to K5) onto the desired substrate (for example paper or polymer film) and imaged using a $CO_2$ IR laser to give brown markings of high contrast (0.5 to 4 watt, 100 to 1000 mm/s).

Example 10

Preparation of a Coating Composition Using D-Glucosamine and in Addition Saccharose and Ammonium Phosphate Dibasic The coating composition is prepared by mixing 30.7 g of water with 40 g of the acrylic binder of example 1. 10.0 g of D-glucosamine hydrochloride, 15.00 g of saccharose and 10.00 g of ammonium phosphate dibasic are added. Then an appropriate amount of aqueous ammonia (25% by weight) is added in order to render the pH alkaline (above 7.0). The emulsion is then stirred at room temperature for 30 minutes. The resulting coating composition is then applied by a coating bar (K1 to K5) onto the desired substrate (for example paper or polymer film) and imaged using a $CO_2$ IR laser to give brown markings of high contrast (0.5 to 4 watt, 100 to 1000 mm/s).

Example 11

Preparation of a Coating Composition Using D-(1)-Glucose and D-Glucosamine

The coating composition is prepared by mixing 38.6 g of water with 40 g of the acrylic binder of example 1. 10.0 g of D-glucose and 10.0 g of D-glucosamine hydrochloride are added. Then appropriate amount of aqueous ammonia (25% by weight) is added in order to render the pH alkaline (above 7.0). The emulsion is then stirred at room temperature for 30 minutes. The resulting coating composition is then applied by

Example 12

Preparation of a Coating Composition Using D-(+)-Glucose and Jeffamine® D-230

The coating composition is prepared by mixing 31.31 g of water with 40.25 g of the acrylic binder of example 1. 8.93 g of Jeffamine® D-230, which is a polypropyleneglycol carrying two terminal amino groups and having a molecular weight of 230 g/mol (is this OK?), is then added followed by 14 g D-(+)-glucose. The emulsion is then stirred at room temperature for 30 minutes. The resulting coating composition is then applied by a coating bar (K1 to K5) onto the desired substrate (for example paper or polymer film) and imaged using a $CO_2$ IR laser to give orange markings of high contrast (0.5 to 4 watt, 100 to 1000 mm/s).

Example 13

Preparation of a Coating Composition Using D-(1)-Glucose and 4-Aminohippuric Acid The coating composition is prepared by mixing 31.31 g of water with 40.25 g of the acrylic binder of example 1. 15.08 g of 4-aminohippuric acid is then added followed by 14 g D-(+)-glucose. The emulsion is then stirred at room temperature for 30 minutes. The pH is kept above 7.5 by the addition of an appropriate amount of ammonia if required. The resulting coating composition is then applied by a coating bar (K1 to K5) onto the desired substrate (for example paper or polymer film) and imaged using a $CO_2$ IR laser to give orange markings of high contrast (0.5 to 4 watt, 100 to 1000 mm/s)

Example 14

Preparation of a Coating Composition Using D-(+)-Glucose and Ethanolamine

The coating composition is prepared by mixing 31.31 g of water with 40.25 g of the acrylic binder of example 1. 4.74 g of ethanolamine is then added followed by 14 g D-(+)-glucose. The pH is kept above 7.5 by the addition of the appropriate amount of ammonia if required. The emulsion is then stirred at room temperature for 30 minutes. The resulting coating composition is then applied by a coating bar (K1 to K5) onto the desired substrate (for example paper or polymer film) and imaged using a $CO_2$ IR laser to give orange markings of high contrast (0.5 to 4 watt, 100 to 1000 mm/s).

Example 15

Preparation of a Coating Composition Using D-(+)-Glucose and 4-Aminobenzoic Acid The coating composition is prepared by mixing 31.31 g of water with 40.25 g of the acrylic binder of example 1. 10.65 g of 4-aminobenzoic acid is then added followed by 14 g D-(+)-glucose. The pH is kept above 7.5 by the addition of the appropriate amount of ammonia if required. The emulsion is then stirred at room temperature for 30 minutes. The resulting coating composition is then applied by a coating bar (K1 to K5) onto the desired substrate (for example paper or polymer film) and imaged using a $CO_2$ IR laser to give orange markings of high contrast (0.5 to 4 watt, 100 to 1000 mm/s).

The invention claimed is:

1. A coating composition comprising
   a) a reducing carbohydrate selected from at least one of an aldose, a ketose, a reducing oligosaccharide and a reducing polysaccharide, and
   b) an amine selected from at least one of an amino acid and an amino sugar,
   wherein the molar ratio of the reducing carbohydrate to the amine is in the range of 10:1 to 1:10.

2. The coating composition of claim 1, wherein the amine is at least one of 4-aminohippuric acid, 4-aminobenzoic acid, glycine, alanine, valine, leucine, isoleucine, proline, phenylalanine, tyrosine, tryphthophane, cysteine, methionine, serine, threonine, lysine, arginine, histidine, aspartic acid, glutamic acid, asparagine and glutamine.

3. The coating composition of claim 1, wherein the amine is glucosamine or galactosamine.

4. The coating composition of claim 1, wherein the reducing carbohydrate is glucose.

5. The coating composition of claim 1, which also comprises a solvent.

6. The coating composition of claim 1, which also comprises a polymeric binder.

7. The coating composition of claim 1, which also comprises a catalyst.

8. A substrate coated with the coating composition of claim 1.

9. A process for preparing a marked substrate, which comprises exposing those parts of the coated substrate of claim 8, where marking is intended, to energy in order to generate a marking.

* * * * *